United States Patent
Wigzell et al.

(10) Patent No.: US 9,192,248 B2
(45) Date of Patent: Nov. 24, 2015

(54) CHILD HARNESS

(71) Applicant: Phil and Teds Design Limited, Wellington (NZ)

(72) Inventors: Paul James Wigzell, Wellington (NZ); Campbell Gower, Wellington (NZ)

(73) Assignee: PHIL AND TEDS DESIGN LIMITED, Newtown, Wellington (NZ)

( * ) Notice: Subject to any disclaimer, the term of this patent is extended or adjusted under 35 U.S.C. 154(b) by 0 days.

(21) Appl. No.: 14/406,153

(22) PCT Filed: Jun. 5, 2013

(86) PCT No.: PCT/NZ2013/000097
§ 371 (c)(1),
(2) Date: Dec. 5, 2014

(87) PCT Pub. No.: WO2013/184007
PCT Pub. Date: Dec. 12, 2013

(65) Prior Publication Data
US 2015/0182036 A1    Jul. 2, 2015

(30) Foreign Application Priority Data
Jun. 7, 2012   (NZ) ........................................ 600510

(51) Int. Cl.
| B60R 22/00 | (2006.01) |
| A47D 15/00 | (2006.01) |
| B62B 9/24 | (2006.01) |
| B60R 22/20 | (2006.01) |
| B60R 22/10 | (2006.01) |
| B60N 2/28 | (2006.01) |
| B60N 2/26 | (2006.01) |

(52) U.S. Cl.
CPC .............. *A47D 15/006* (2013.01); *B60N 2/265* (2013.01); *B60N 2/2812* (2013.01); *B60R 22/105* (2013.01); *B60R 22/20* (2013.01); *B62B 9/24* (2013.01)

(58) Field of Classification Search
CPC ........ B60R 22/12; B60R 22/20; B60R 22/26; B60R 22/105; A47D 15/006; B62B 9/24; B60N 2/2812; B60N 2/265
See application file for complete search history.

(56) References Cited

U.S. PATENT DOCUMENTS

| 6,030,047 A | 2/2000 | Kain |
| 6,101,687 A * | 8/2000 | Giampavolo et al. ........... 24/302 |
| 6,581,968 B1 * | 6/2003 | Grace et al. ................ 280/801.1 |

(Continued)

FOREIGN PATENT DOCUMENTS

| DE | 10106920 | * | 9/2002 |
| EP | 0422812 B1 | | 3/1994 |
| EP | 1336531 | | 8/2003 |
| WO | WO 2006/129112 | | 12/2006 |

OTHER PUBLICATIONS

International Search Report issued for International Patent Application No. PCT/NZ2013/000097, mailed Oct. 23, 2013. 7 pages.

(Continued)

*Primary Examiner* — Philip Gabler
(74) *Attorney, Agent, or Firm* — Perkins Coie LLP

(57) ABSTRACT

Described herein is a child harness for use in car seats, child buggies and other devices where a child (or adult) is to be restrained on a seat. The harness design avoids the presence of 'tails' or loose endings thereby minimizing any risk of such endings becoming tangled in other objects. The design also allows for a wide variety of size adjustment.

17 Claims, 10 Drawing Sheets

(56) References Cited

U.S. PATENT DOCUMENTS

| | | | |
|---|---|---|---|
| 6,676,219 B1 * | 1/2004 | Brewer | 297/485 |
| 6,834,621 B1 * | 12/2004 | O'Neill | 119/771 |
| 7,488,038 B2 * | 2/2009 | Boyle et al. | 297/255 |
| 7,547,065 B2 | 6/2009 | Barger | |
| 7,591,510 B1 | 9/2009 | Giampavolo | |
| 8,001,634 B2 | 8/2011 | Ayette et al. | |
| 2002/0070593 A1 * | 6/2002 | Takayama | 297/250.1 |
| 2008/0258527 A1 | 10/2008 | Gower | |
| 2011/0062753 A1 | 3/2011 | Kennedy et al. | |
| 2011/0309663 A1 | 12/2011 | Brunick et al. | |

OTHER PUBLICATIONS

International Preliminary Report on Patentability issued for International Patent Application No. PCT/NZ2013/000097, mailed Oct. 7, 2014. 24 pages.

Hamilton, Laura. "Phil & Ted's Explorer Stroller—Instructions." YouTube, Aug. 30, 2011. <www.youtube.com/watch?v=LoOfF9SDnOc>.

* cited by examiner

CHILD HARNESS

RELATED APPLICATION

This application is a 35 U.S.C. §371 National Stage Application of International Application No. PCT/NZ2013/000097, filed Jun. 5, 2013, which derives priority from New Zealand Patent Application No. 600510, filed Jun. 7, 2012, the contents of which are incorporated herein by reference.

TECHNICAL FIELD

Described herein is a child harness. More specifically, a child harness is described that has no loose strap endings on the working area of the seat and which is highly adjustable to suit the child size.

BACKGROUND ART

Child harnesses are common in the art and widely used in many apparatus including car capsules, child booster seats, child buggies or perambulators and even in child toys. All have a similar function or aim being to safely restrain and support a child on a seat or product.

A common feature of existing harness designs is the presence of loose strap endings termed 'tails', hereafter being terminating straps in the working area of the seat, being the external area of the seat. Often these tails are used to tighten the straps so are integral to the design and cannot easily be hidden or tucked away—many designs for example have a strap or straps extending from the base of the seat that are pulled or loosened to tighten or loosen the shoulder straps. While having a terminating ending strap or tail like this may be useful for quick adjustment, strap endings or tails can be problematic. The straps can be caught when manoeuvring the child into or out of the seat therefore presenting at least a nuisance, or at worst a hazard, for slipping and dropping the child. The loose straps also may be attractive for the child to play with and in playing, the straps can entrap or even choke the child.

A further problem with art harnesses is that the level of adjustment of the harness size only caters for a discrete smaller range of sizes meaning the product can only be sold for a smaller age range. This detracts from the saleability of the product since the harness reduces the length of use of the product. Harnesses that can cater for a wider range of size/age child are preferable as the purchaser can buy one item to cover a wider range of size/age child and therefore reduce cost long term.

Further aspects and advantages of the child harness will become apparent from the ensuing description that is given by way of example only.

SUMMARY

Described herein is a harness for use in retaining a child on a seat. The seat may be a car seat, a child buggy seat or various other products where there is a desire to safely retain a child in a seat.

In some embodiments there is provided a harness for securing a child to a seat, the seat including a flat or semi-flat base and an upright back portion wherein:

the harness is a five point harness, including two straps extending from the shoulder portion of the child to the hip portion of the child when seated and wherein both straps are centrally linked to a further strap originating from the crotch region of the child when seated about a linkage; and, each shoulder strap includes a front looped section, comprising an adjustable loop having at least a length of strap that runs back along the length of the adjustable loop when in use, the loop being adjustable in length to suit the child size, the transition between the upper portion of each shoulder strap being fixed about a slot or slots in the seat back and wherein each shoulder strap links to the crotch strap via a linkage; and, wherein there are no loose strap endings in the working area of the seat.

In some embodiments there is provided a method of adjusting a harness substantially as described above by the step of:

(a) adjusting the front loop length to contract or expand the harness size.

In some embodiments there is provided a method of adjusting a harness substantially as described above by the steps of:

(a) adjusting the front loop length to contract or expand the harness size; and/or (b) adjusting the rear loop length to contract or expand the harness size.

In some embodiments, there is provided a child car capsule including a harness substantially as described above.

In some embodiments there is provided a child car seat including a harness substantially as described above.

In some embodiments there is provided a child buggy including a harness substantially as described above.

As should be appreciated from the above descriptions, the above described harness may be used in a wide variety of applications where a child is to be secured to a seat. Non-limiting examples include a harness on a child buggy, a harness in a child car capsule, a harness in a car booster seat, a harness used to retain a child on a play toy, and a harness used to retain a child in a bicycle trailer.

The harness described above confers at least two key advantages. The first advantage being the absence of 'tails' or strap termination points in the working area of the seat, all such terminal points located behind or hidden within the seat. This is ideal from a safety viewpoint as it avoids catching points or choking points for a child carried therein. A second key advantage is the high degree of size variation possible using the harness described herein. The described harness may be used for a wide variety of sized (age) child owing to the high degree of adjustment allowed for in the design thus allowing a parent to buy one product for a wide variation in child age.

BRIEF DESCRIPTION OF THE DRAWINGS

Further aspects of the harness and methods of use will become apparent from the following description that is given by way of example only and with reference to the accompanying drawings in which.

DETAILED DESCRIPTION

Figure 1:
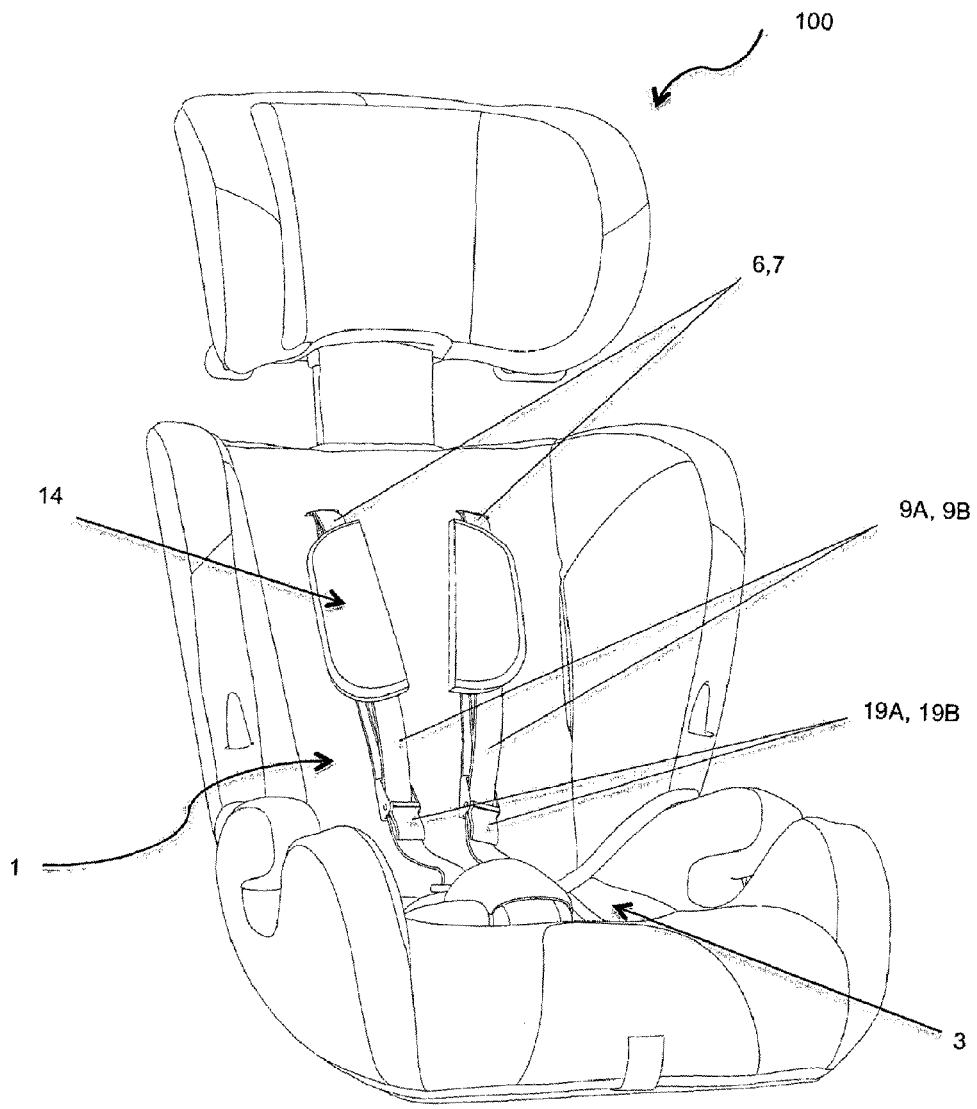
FIG. 1 illustrates a perspective view of the harness attached to a car seat.

As noted above, described herein is a harness for use in retaining a child on a seat. The seat may be a car seat, a child buggy seat or various other products where there is a desire to safely retain a child in a seat.

For the purposes of this specification, the term 'about' or 'approximately' and grammatical variations thereof mean a quantity, level, degree, value, number, frequency, percentage, dimension, size, amount, weight or length that varies by as much as 30, 25, 20, 15, 10, 9, 8, 7, 6, 5, 4, 3, 2, or 1% to a reference quantity, level, degree, value, number, frequency, percentage, dimension, size, amount, weight or length.

The term 'substantially' refers to at least about 50%, for example 75%, 85%, 95% or 98%.

For the purpose of this specification the term 'comprise' and grammatical variations thereof shall have an inclusive meaning—i.e. that it will be taken to mean an inclusion of not only the listed components it directly references, but also other non-specified components or elements.

The term 'harness' refers to a strap based restraint or support.

The term 'working area of the seat' or grammatical variations thereof refers to the region of a seat exposed to the child during normal seating use and excludes portions either behind seat padding or otherwise hidden from view such as behind the seat.

The term 'adjustable' or grammatical variations thereof in the context of the harness described herein means that the harness strap length may be adjusted to restrain a child against a seat, the degree of adjustment being relative to the size of child on the seat.

The term 'seat' or grammatical variations thereof refers to a frame arrangement designed to support a child.

The term 'child' or grammatical variations thereof is used for ease of description. While reference is made to securing a child to a seat, it should be appreciated that the harness may also be used by adults for example to secure an adult to a vehicle seat. Reference to the term child should not be seen as limiting and securing of an adult is also intended to be encompassed within the specification.

The terms 'flat' and 'semi-flat' are used to described the contour of the seat base. These terms are used to refer to the approximate shape of the seat base when a child is seated thereon relative to the ground. Variations in shape such as contoured sides or portions thereof are still intended to be encompassed by these terms.

The term 'upright' when used in conjunction with the seat back refers to the back region being in a generally vertical orientation relative to the ground when a child is seated thereon. Variations in seat back angle ranging from 10, or 20, or 30, or 40, or 50, or 60, or 70, or 80, or 90, or 100 degrees relative to a horizontal ground level are intended to be encompassed within this term. Similarly varying contours in the seat back are also intended to be encompassed within this term and should not be seen as limiting.

In some embodiments there is provided a harness for securing a child to a seat, the seat including a flat or semi-flat base and an upright back portion wherein:

the harness is a five point harness, including two straps extending from the shoulder portion of the child to the hip portion of the child when seated and wherein both straps are centrally linked to a further strap originating from the crotch region of the child when seated about a linkage; and, each shoulder strap includes a front looped section, comprising an adjustable loop having at least a length of strap that runs back along the length of the adjustable loop when in use, the loop being adjustable in length to suit the child size, the transition between the upper portion of each shoulder strap being fixed about a slot or slots in the seat back and wherein each shoulder strap links to the crotch strap via a linkage; and, wherein there are no loose strap endings in the working area of the seat.

The crotch strap may attach to the seat via a mechanical fastener. The crotch strap may attach to the seat by being looped through an aperture or apertures in the seat base and then the strap is fixed to itself. As should be appreciated, the crotch strap is anchored to the seat base.

Each shoulder strap may be attached via a bracket to the seat back portion, the bracket being slidably movable vertically through a keyed aperture in the seat back portion allowing the top height of the shoulder strap or straps to be adjusted.

The bracket may include a loop at one end through which the strap or straps thread and a boss shaped outlier at the opposing end that prevents the bracket passing through the keyed aperture in the seat back portion.

Each front strap loop may terminate at a sliding lock adjuster located at one distil end of the loop. The sliding lock adjuster may be opened, moved to lengthen or shorten the loop size, and then locked in order to fix the front loop size thereby setting the front strap length.

A quick attach buckle may be used to terminate the opposing distil end of the front loops to allow easy attachment and detachment of the front straps when a child is fitted or removed from the seat.

Single straps may extend from the lower point of each front loop and attach to the seat back portion approximate the hip region of the child when seated. The straps may be attached to the seat either directly via a mechanical and/or chemical fastener or via an attachment bracket or lug. The linkage between the shoulder straps and the crotch strap may be located about a forward facing region approximate the crotch strap ending and the two shoulder straps. The linkage may be a quick attach crotch buckle located at the terminus of the crotch strap into which two mating buckle clips, one on each shoulder strap, fit therein. The two clips may be left and right orientated according to which side of the child they relate to and the clips nest together when linked into the crotch buckle.

Each shoulder strap may include two separate looped sections being a rear loop and front loop, the transition between the front and rear loops being approximate the shoulder attachment point and wherein the rear loops are hidden behind a seat cushion or pad and not visible from the working area of the seat.

The rear loops may include a single loop with a buckle at one distil end. The buckle may be located at the top end of the rear loop adjacent the shoulder strap attachment point. The buckle may include a ladder lock arrangement allowing the rear loop to be extended or contracted depending on the size of the child and harness size required.

The harness region about the shoulder attachment point may be a single rear strap terminating at one end about a quick attach buckle that in turn links to the front loop of a shoulder strap and the rear strap also terminating at the opposing end at the rear loop buckle or ladder lock buckle. The rear strap may pass through the loop region of the bracket attachment.

In some embodiments there is provided a method of adjusting a harness substantially as described above by the step of:
  (a) adjusting the front loop length to contract or expand the harness size.

In some embodiments there is provided a method of adjusting a harness substantially as described above by the steps of:
  (a) adjusting the front loop length to contract or expand the harness size; and/or
  (b) adjusting the rear loop length to contract or expand the harness size.

In the above method, the shoulder attachment point height may be adjusted by lifting or lowering the height of the shoulder attachment points relative to the upright back portion of the seat.

In some embodiments, there is provided a child car capsule including a harness substantially as described above.

In some embodiments there is provided a child car seat including a harness substantially as described above.

In some embodiments there is provided a child buggy including a harness substantially as described above.

As should be appreciated from the above description, the above described harness may be used in a wide variety of applications where a child is to be secured to a seat. Non-limiting examples include a harness on a child buggy, a harness in a child car capsule, a harness in a car booster seat, a harness used to retain a child on a play toy, and a harness used to retain a child in a bicycle trailer. The harness may also be used to restrain/support an adult to a seat such as in a vehicle seat.

The harness has described above has two key advantages, one being the absence of 'tails' or strap termination points on the working area of the seat, all such terminal points located behind or hidden within the seat. This is ideal from a safety viewpoint as it avoids catching points or choking points for a child carried thereon. A second key advantage is the high degree of size variation possible using the harness described herein. The described harness may be used for a wide variety of sized (age) child owing to the high degree of adjustment allowed for in the design. Catering for a wide range of sizes means the product using the harness may have a longer duration of use as the child grows. This can be attractive as it reduces the cost of buying multiple items versus one that may be used for a wide age range.

The harness may be adjusted in a first step to a smaller size by lengthening the rear loops to their maximum length. This is completed by pulling the rear strap through the ladder lock until the ladder lock lies adjacent the seat slide adjuster bracket which effectively is the end point of the rear strap when in a contracted configuration. The rear loops are hidden behind the seat padding or cushion. Adjustment to a smallest size may further be completed by extending the length of the front loops to their maximum size by unlocking and moving the slide lock adjusters as close as possible to the crotch buckle region. Conversely, to extend the harness size, the front loops may first be reduced in size to extend the harness size by adjustment via the slide lock adjusters. If a larger size harness is required, the rear loops may also be reduced in size through the ladder lock thereby extending the rear strap and extending the harness size.

In an alternative embodiment to the above, the rear loops may be threaded through an aperture or apertures in the seat back and retained in place to further reduce the harness size. Optionally, depending on the design of the harness, the lower strap region of the shoulder straps below the front loops may also be threaded through the lower attachment points away from the seat working area to further reduce the harness size. It a yet further configuration, the crotch strap may also thread into the lower portion of the seat to further reduce the harness size. Conversely to the above, the lower strap region of the shoulder straps below the front loops may also be threaded through the lower attachment points to the seat working area to further increase the harness size. It a yet further configuration, the crotch strap may also thread into the working area of the seat and out of the lower portion of the seat to further increase the harness size.

Also as noted above, the harness has the advantage of being able to be adjusted to suit the shoulder height of the child. As noted above, the shoulder attachment points for the harness may include a bracket at each point/side that moves slidably through a keyed aperture. To accommodate a smaller child, the shoulder height may be decreased by lowering the shoulder attachment points by sliding the brackets down the keyed apertures in the seat. Conversely, sliding the brackets up in the aperture may accommodate taller children.

The embodiments described above may also be said broadly to consist in the parts, elements and features referred to or indicated in the specification of the application, individually or collectively, and any or all combinations of any two or more said parts, elements or features, and where specific integers are mentioned herein which have known equivalents in the art to which the embodiments relates, such known equivalents are deemed to be incorporated herein as of individually set forth.

Where specific integers are mentioned herein which have known equivalents in the art to which this invention relates, such known equivalents are deemed to be incorporated herein as if individually set forth.

The above described harness and methods are now described by reference to specific embodiments.

WORKING EXAMPLES

Figure 2:
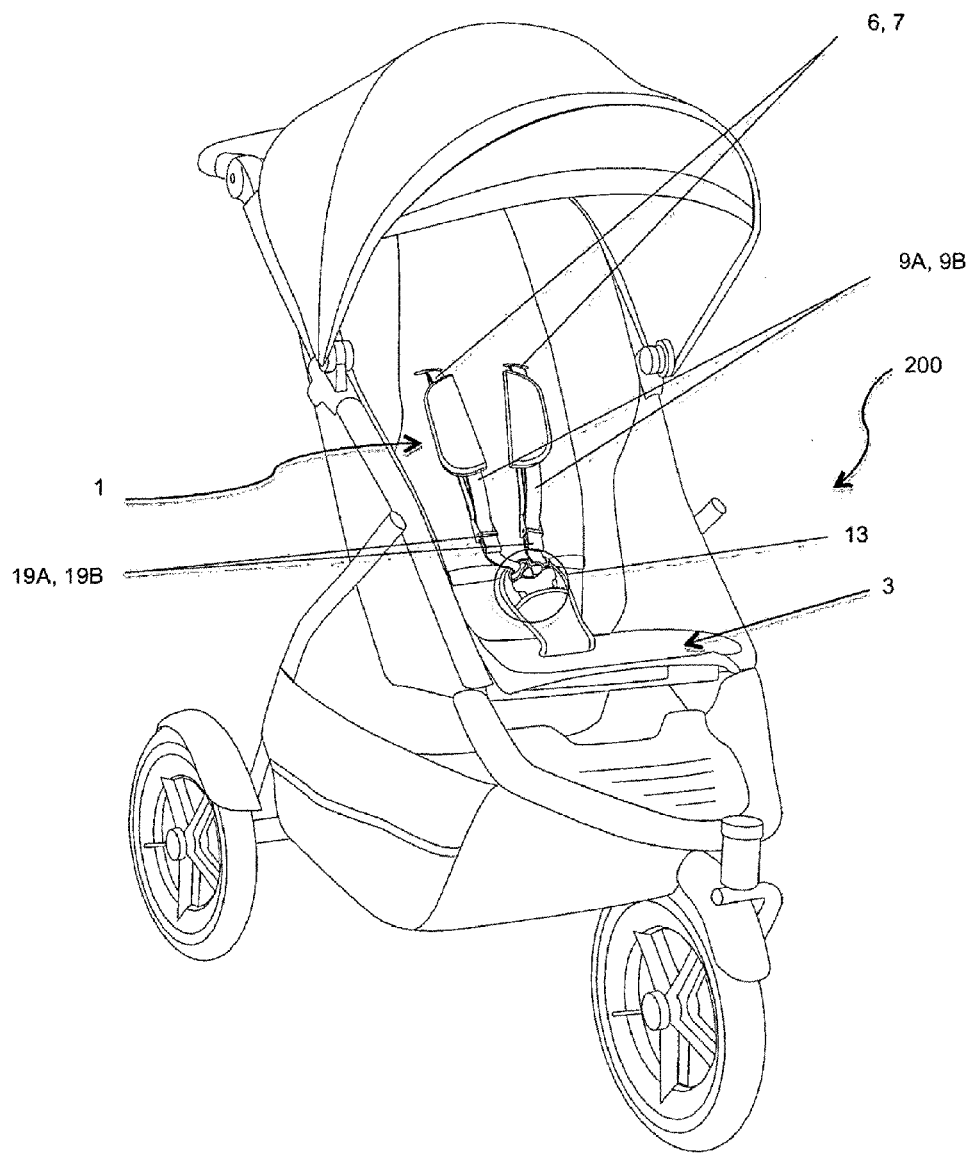
FIG. 2 illustrates a perspective view of the harness attached to a buggy seat.
Figure 3:
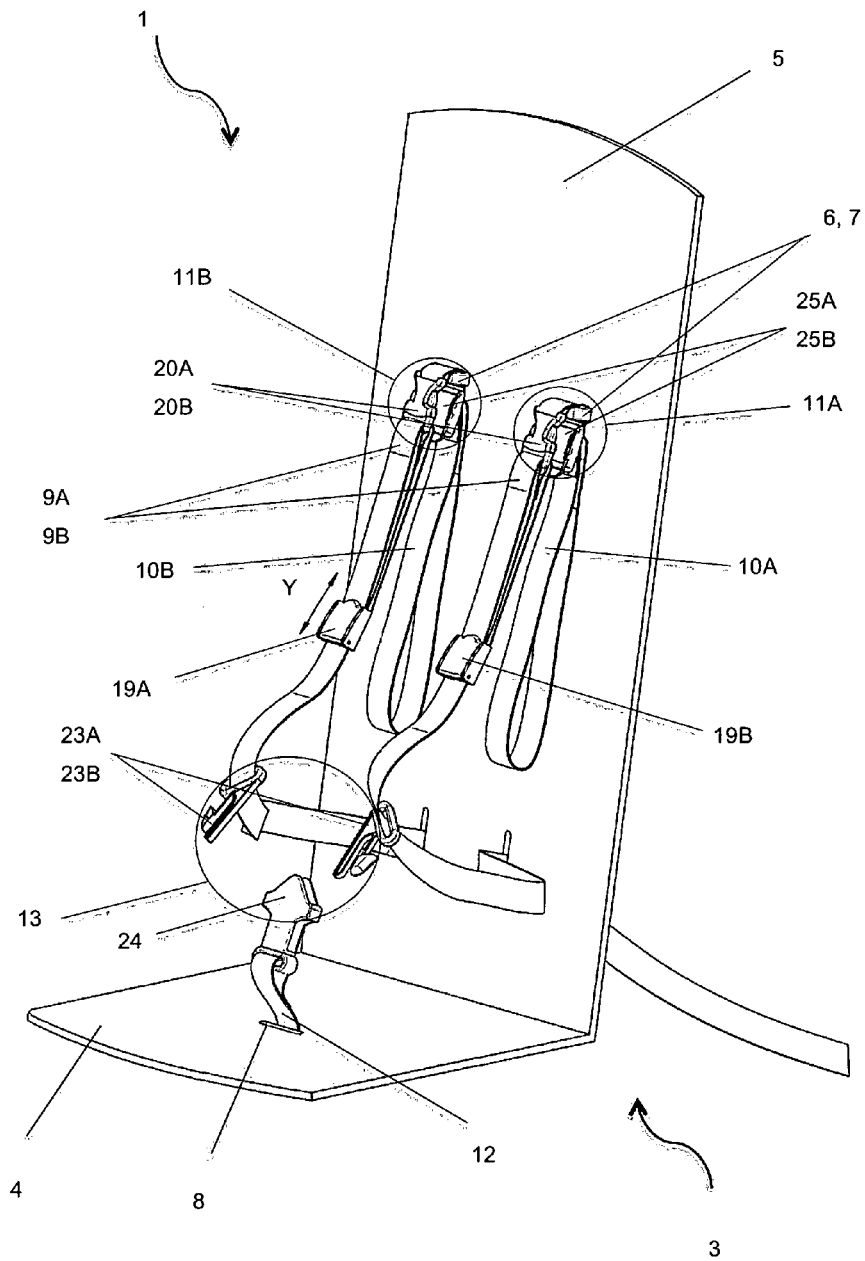
FIG. 3 illustrates a perspective view of the harness attached to a generic seat base and back with padding removed to show details of the harness system.
Figure 4:
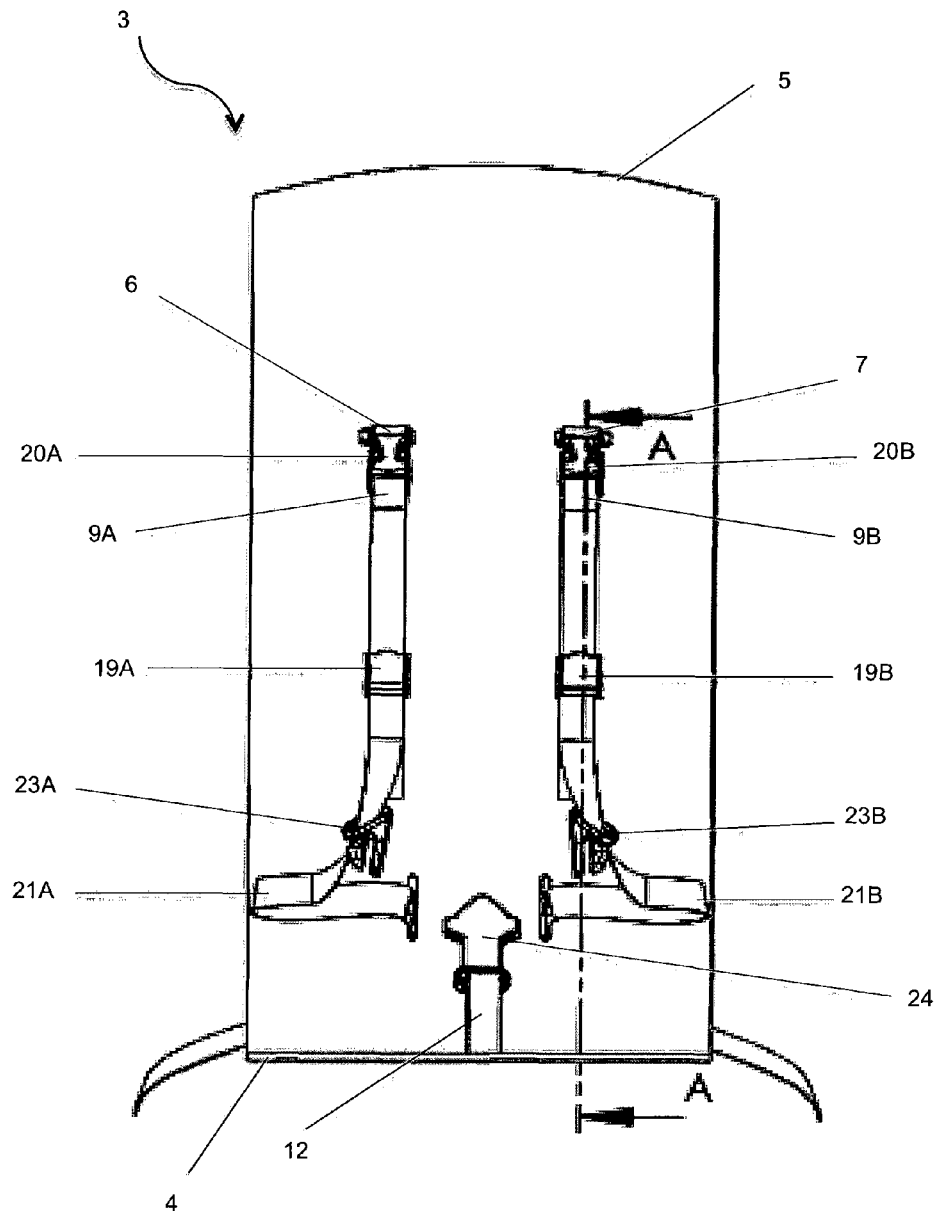
FIG. 4 illustrates a front elevation view of the seat and harness of FIG. 3.

Referring to FIG. 1 and FIG. 2, two embodiments of the harness 1 and seat 3 are illustrated, FIG. 1 showing a car seat 100 embodiment and FIG. 2 showing a buggy 200 embodiment. As should be appreciated, the harness 1 described herein may be used on a wide variety of apparatus and reference to car seats 100 or buggies 200 should not be seen as limiting. As can be seen, the harness 1 does not have any protruding 'tails' or terminating straps on exterior of the seat 3 cushion or padding 14.

FIGS. 3 to 6 illustrate the harness 1 and seat 3 in more detail with any padding or cushioning removed.

A harness 1 is shown generally by arrow 1 for securing a child (not shown) to a seat 3, the seat 3 including a flat or semi-flat base 4 and an upright back portion 5. As should be appreciated, the back portion 5 may be at varying angles to suit the application.

The harness 1 includes two shoulder straps including two front loops 9A, 9B linked to one crotch strap 12. The upper portion of the shoulder straps attach to the seat back 5 approximate the left and right shoulders of the child (not shown) when seated marked as points 6 and 7, and the crotch strap 12 attaches to the seat base 4 approximate the crotch of the child (not shown).

Each shoulder strap includes two separate looped sections being a front loop 9A, 9B and rear loop 10A, 10B, the transition 11A, 11B between front 9A, 9B and rear loops 10A, 10B being approximate the shoulder attachment points 6, 7 and each shoulder strap links to the crotch strap 12 via a linkage 24.

The rear loops 10A, 10B are hidden behind a seat cushion or pad during normal use (not shown) and there are no loose strap endings in the working area of the seat 3.

The crotch strap 12 may attach to the seat 3 via a mechanical fastener (not shown) or by being looped through an aperture 8 in the seat base 4 (not shown).

Figure 5:
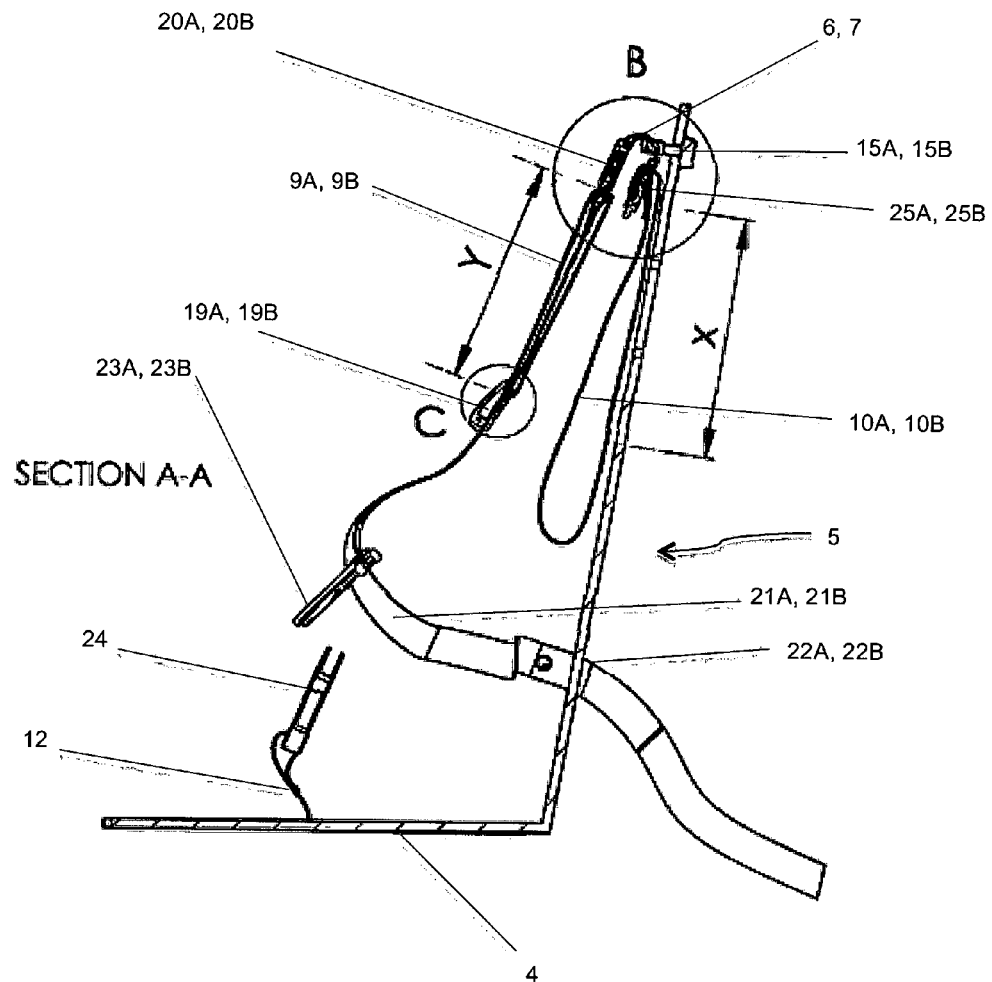
FIG. 5 illustrates a detail cross section side view about section A-A shown in FIG. 4.
Figure 6:
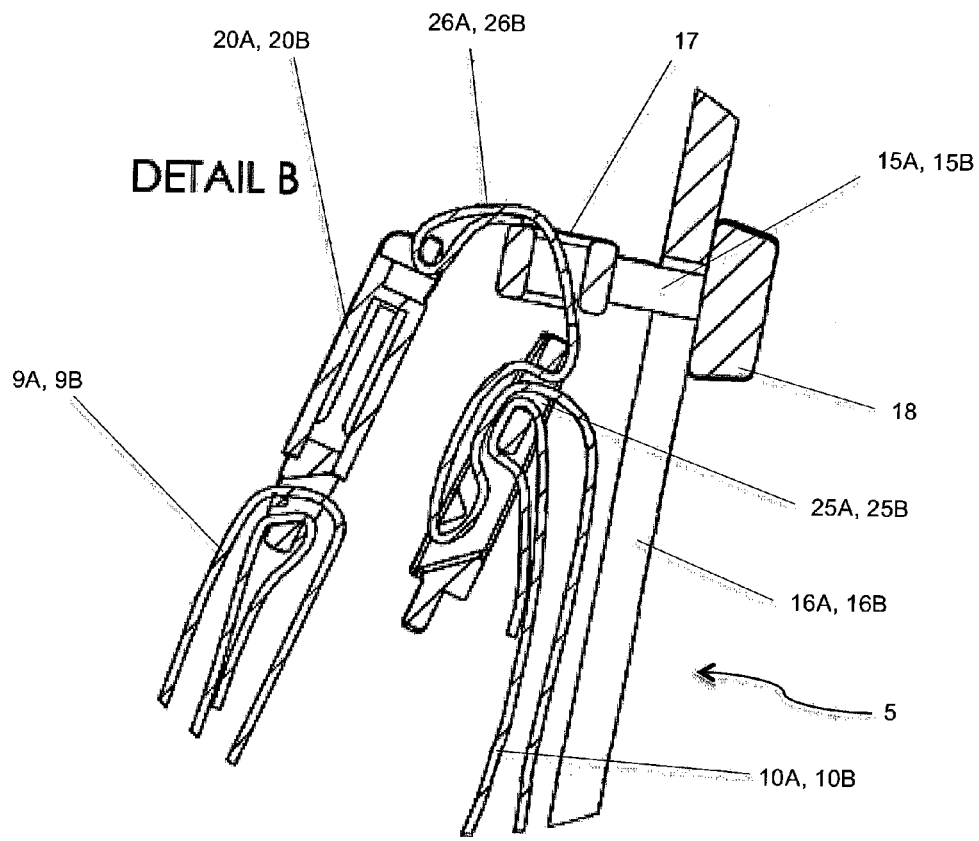
FIG. 6 illustrates a detail cross section side view of the shoulder portion of the harness being items B and C shown in FIG. 5.
Figure 6:
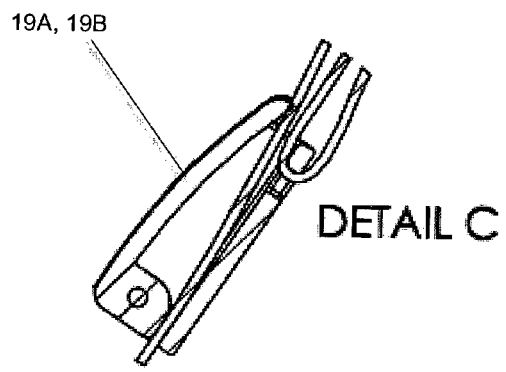

Each shoulder strap may be attached via a bracket 15A, 15B to the seat back portion, best shown in FIG. 5 and FIG. 6. The brackets 15A, 15B being slidably movable vertically along path X through a keyed aperture 16A, 16B in the seat back 5 allowing the top height of the shoulder strap or straps to be adjusted.

The brackets 15A, 15B may include a ring 17 at one end through which the strap or straps 26A, 26B thread and a boss shaped outlier 18 at the opposing end that prevents the bracket 15A, 15B passing through the keyed aperture 16A, 16B in the seat back 5.

Each front strap loop 9A, 9B may terminate at a sliding lock adjuster 19A, 19B located at one distil end of the loop. The sliding lock adjuster 19A, 19B may be opened, moved to lengthen or shorten the loop size along direction Y and then locked in order to fix the front loop 9A, 9B size thereby setting the front strap length.

A quick attach buckle 20A, 20B may be used to terminate the opposing distil end of the front loops 9A, 9B to allow easy attachment and detachment of the front straps when a child (not shown) is fitted or removed from the seat 3.

Single straps 21A, 21B may extend from the lower point of each front loop 9A, 9B and attach to the seat back 5 approximate the hip region of the child (not shown) when seated indicated by arrows 22A, 22B. The straps 21A, 21B may be attached to the seat 3 either directly via a mechanical and/or chemical fastener or via an attachment bracket or lug (not shown).

The linkage between the shoulder straps and the crotch strap 12 may be located about a forward facing region 13 approximate the crotch strap ending and the two shoulder straps.

The linkage includes a quick attach crotch buckle 24 located at the terminus of the crotch strap 12 into which two mating buckle clips 23A, 23B, one on each shoulder strap, fit therein. The two clips 23A, 23B may be left and right orientated according to which side of the child they relate to and the clips 23A, 23B nest together when linked into the crotch buckle 24.

The rear loops 10A, 10B may include a single loop with a buckle 25A, 25B at one distil end. The buckles 25A, 25B may be located at the top end of the rear loops 10A, 10B adjacent the shoulder strap attachment points 6,7. The buckles 25A, 25B may include a ladder lock arrangement best shown in FIG. 6 allowing the rear loops 10A, 10B to be extended or contracted depending on the size of the child and harness size required.

The harness 1 region about the shoulder attachment points 6,7 may be single rear straps 26A, 26B terminating at one end about the quick attach buckles 20A, 20B that in turn link to the front loops of the shoulder straps 9A, 9B and the rear straps also terminate at the opposing ends at the rear loop buckles or ladder lock buckles 25A, 25B. The rear strap 26A, 26B may pass through the loop region 17 of the bracket attachment 15A, 15B.

The harness 1 may be adjusted by the steps of:
(a) adjusting the front loop 9A, 9B length to contract or expand the harness 1 size; and/or
(b) adjusting the rear loop 10A, 10B length to contract or expand the harness 1 size.

The shoulder attachment point 6,7 height may also be adjusted by lifting or lowering the height of the shoulder attachment points 6,7 relative to the back 5 of the seat 3.

Figure 7:
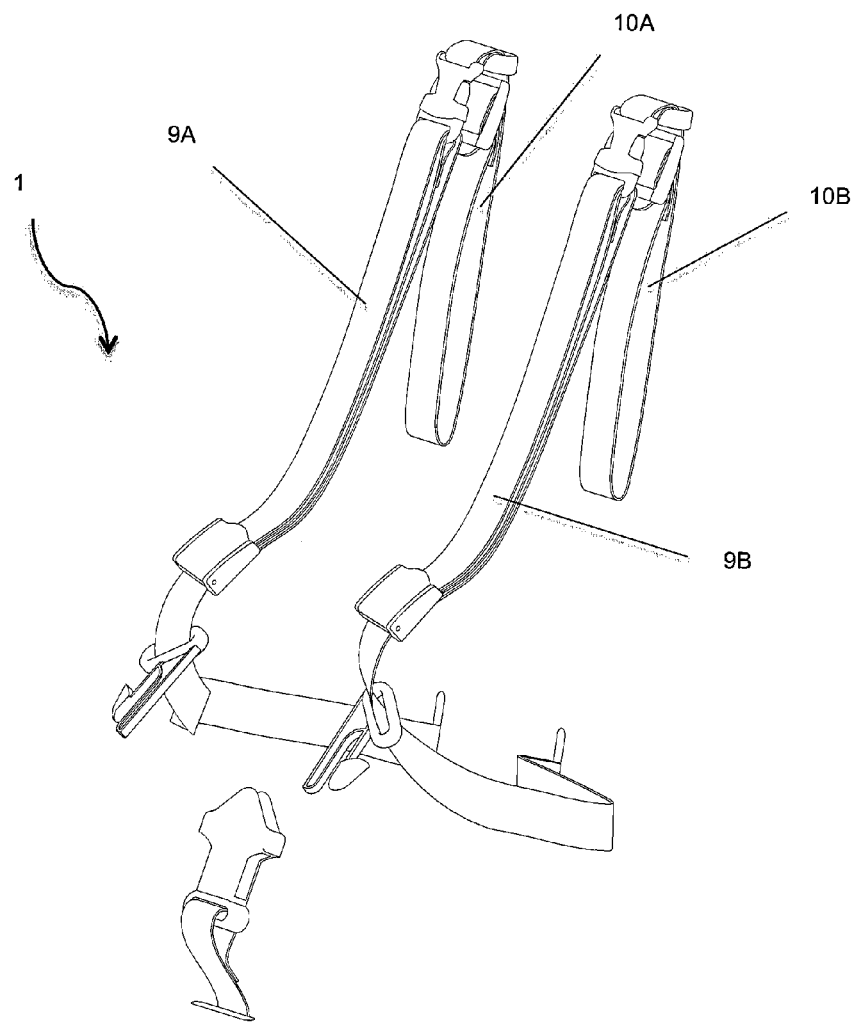
FIG. 7 illustrates a perspective view of the harness in a fully contracted state (for a small child)
Figure 8:
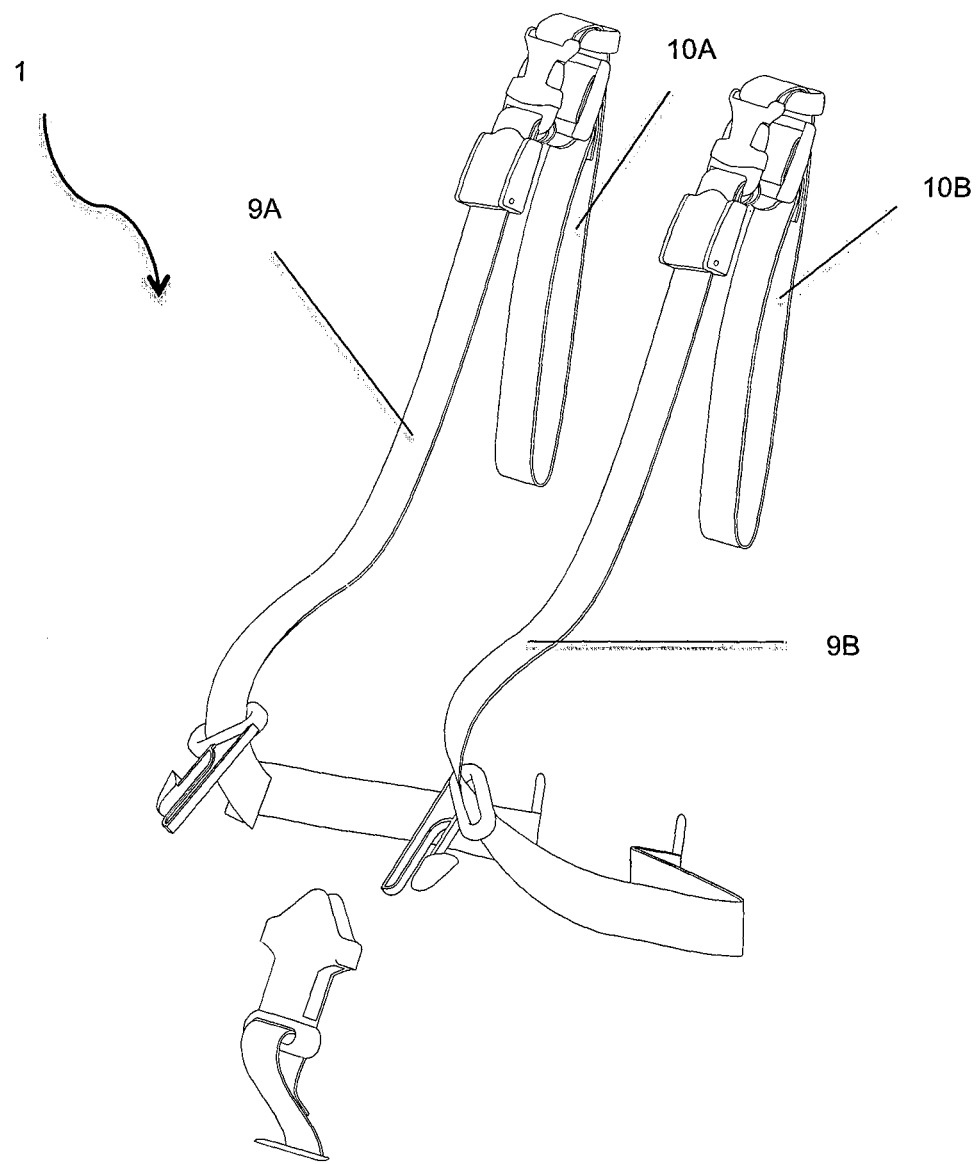
FIG. 8 illustrates a perspective view of the harness in an intermediate state (for a medium child)

FIG. 7 shows the harness 1 adjusted to a fully contracted size with both loops (front 9A, 9B and rear 10A, 10B) at their longest loop length (fully contracted) so as to minimise the harness 1 size for a small sized child (not shown). FIG. 8 shows the harness 1 adjusted to an intermediate configuration with the front loops (9A, 9B) fully extended and the rear loops (10A, 10B) fully contracted for a medium sized child (not shown).

Figure 9:
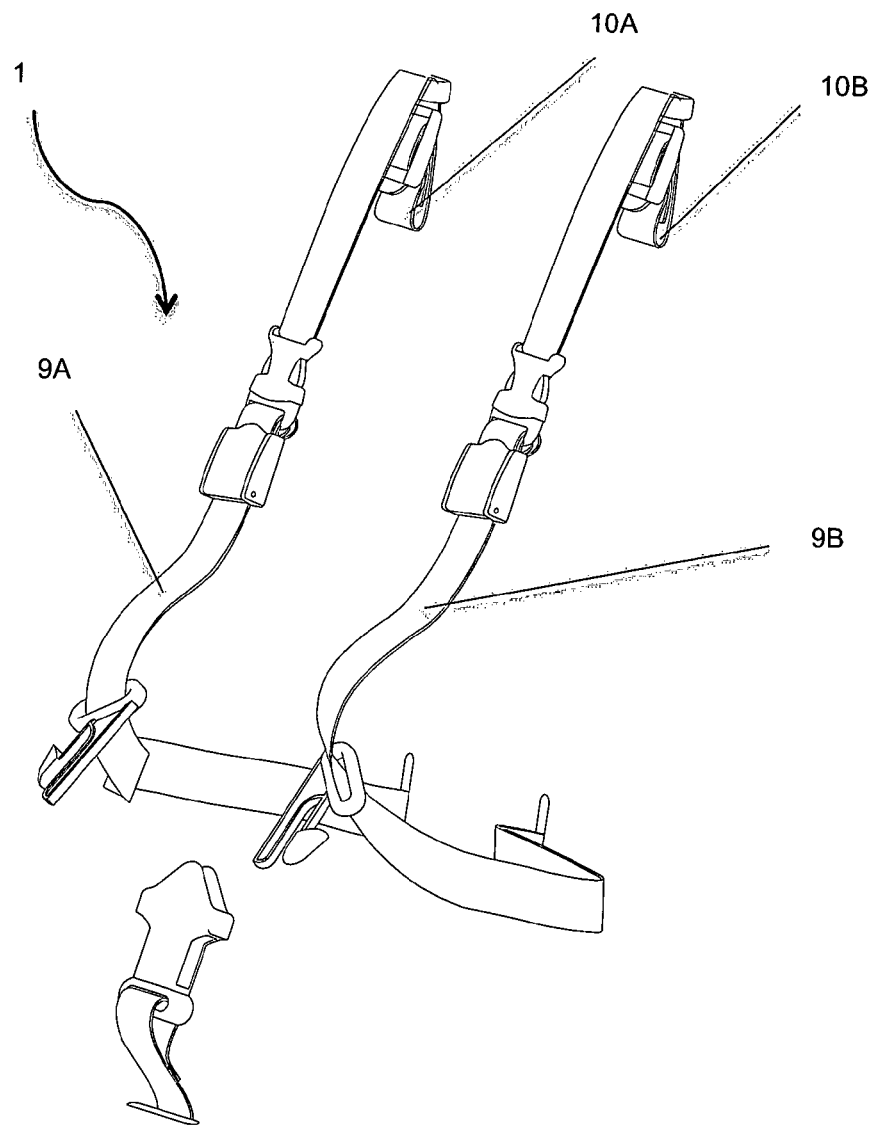
FIG. 9 illustrates a perspective view of the harness in a fully extended state (for a large child)

FIG. 9 shows the harness 1 adjusted with both loops (front 9A, 9B and rear 10A, 10B) fully extended so as to maximise the harness 1 size for a large sized child (not shown) or a child wearing a bulky jacket etc.

It should be appreciated that the loops (front 9A, 9B and rear 10A, 10B) may be adjusted to any length combination as deemed necessary to alter the degree of size variation. Also, the harness 1 may be used in a wide variety of applications where a child (not shown) is to be secured to a seat 3.

Figure 10:
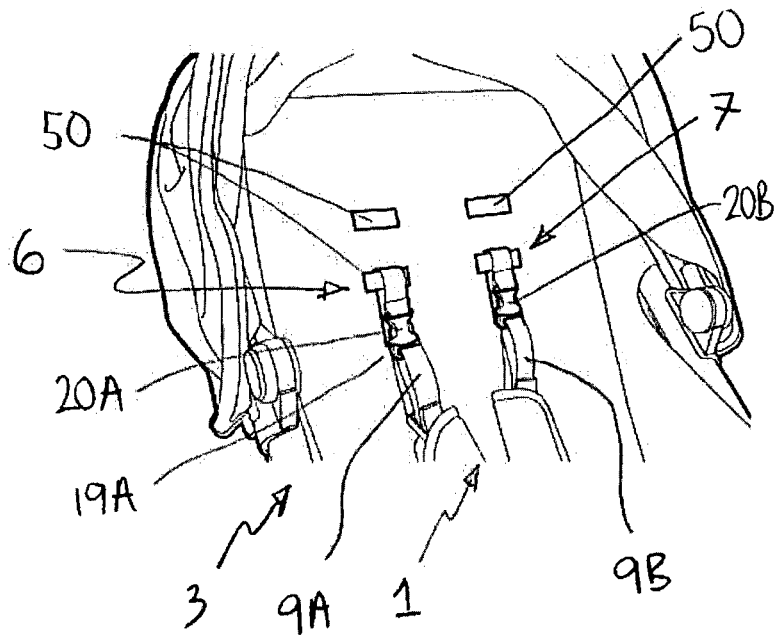
FIG. 10 illustrates an alternative harness embodiment using only front loops and no rear loops.
Figure 11:
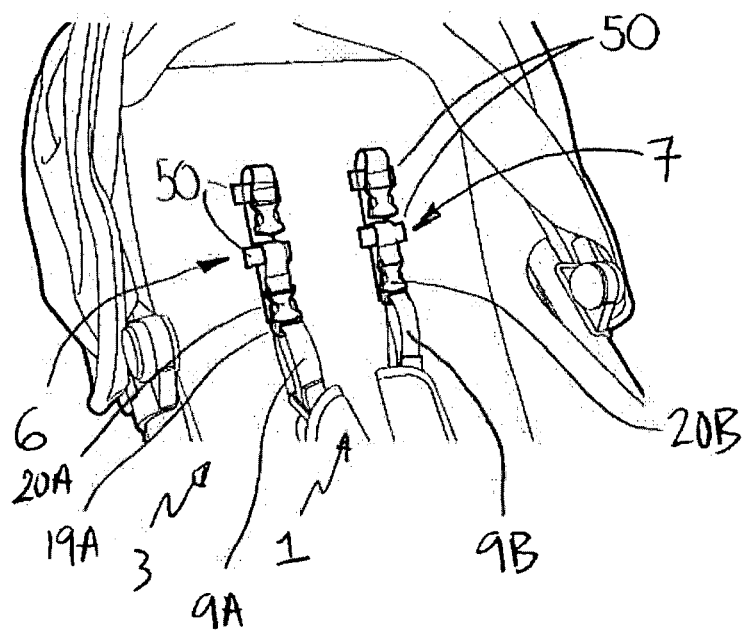
FIG. 11 illustrates a method of adjusting the shoulder height of the embodiment shown in FIG. 10.

FIG. 10 and FIG. 11 illustrate an alternative arrangement harness 1 using only front loops 9A, 9B and no rear loops. As illustrated, the harness 1 incorporates two straps emanating from the shoulder region 6, 7, the straps including front loops 9A, 9B (note seat padding is not shown in these Figures for clarity). The loop 9A, 9B length is adjustable to suit the size of child via ladder lock buckles 19A, 19B. The top of each loop 9A, 9B passes around a portion of the backrest of the seat 50 thus securing the shoulder strap to the seat base at the shoulder region 6, 7. The other ends of the straps terminate about the hip of the child when seated (not shown). The loops 9A, 9B may be unclipped by undoing the quick attach buckles 20A, 20B. As shown in FIG. 11, the height of the shoulder straps may be adjusted by fixing the shoulder straps to different mounting points 50 on the seat 3.

The harness 1 has no 'tails' or strap termination points on the working area of the seat 3 thereby avoiding risk of catching or choking hazards. A high degree of size variation can also be catered for using this harness 1 design.

Aspects of the harness, methods of use and related products have been described by way of example only and it should be appreciated that modifications and additions may be made thereto without departing from the scope of the claims herein.

What is claimed is:

1. A harness for securing a child to a seat, the seat including a flat or semi-flat base and an upright back portion wherein:
   the harness is a five point harness, including two shoulder straps extending from a shoulder portion of the seat to a hip portion of the seat and wherein both shoulder straps are centrally linked to a crotch strap originating from a crotch region of the seat; and,
   each shoulder strap includes a front looped section, comprising an adjustable loop having at least a length of strap that runs back along the length of the adjustable loop when in use, the adjustable loop being adjustable in length, a transition at an upper portion of each shoulder strap being fixed about a slot or slots in the upright back portion and wherein each shoulder strap links to the crotch strap via a linkage; and,
   wherein there are no loose strap endings in a working area of the seat.

2. The harness as claimed in claim 1 wherein each shoulder strap is attached via a bracket to the upright back portion, the bracket being slidably movable vertically through a keyed aperture in the upright back portion allowing the top height of the shoulder strap or straps to be adjusted.

3. The harness as claimed in claim 2 wherein the bracket includes a loop at one end through which the shoulder strap or straps thread and a boss shaped outlier at the opposing end that prevents the bracket passing through the keyed aperture in the upright back portion.

4. The harness as claimed in claim 1 wherein each adjustable loop terminates at a sliding lock adjuster located at one distal end of the adjustable loop.

5. The harness as claimed in claim 4 wherein the sliding lock adjuster is configured to be opened, moved to lengthen or shorten the adjustable loop size, and then locked in order to fix the adjustable loop size to thereby set the shoulder strap length.

6. The harness as claimed in claim 1 wherein a quick attach buckle is used to terminate an opposing distal end of the adjustable loops to allow attachment and detachment of the shoulder straps when a child is fitted to or removed from the seat.

7. The harness as claimed in claim 1 wherein each shoulder strap front looped section terminates at a quick attach buckle located approximate the shoulder region of the front looped section and a sliding lock adjuster slidingly located approximate the crotch end of the front looped section.

8. The harness as claimed in claim 1 wherein single straps extend from the lower point of each front looped section and attach to the upright back portion approximate the hip region of the seat.

9. The harness as claimed in claim 8 wherein the single straps are attached to the seat either directly via a mechanical or chemical fastener or via an attachment bracket or lug.

10. The harness as claimed in claim 1 wherein the shoulder straps and crotch strap are linked about a linkage located at a forward facing region proximate a crotch strap end and the two shoulder straps.

11. The harness as claimed in claim 10 wherein the linkage is a quick attach crotch buckle located at the end of the crotch strap into which two mating buckle clips, one on each shoulder strap, fit therein.

12. The harness as claimed in claim 11 wherein the two clips are left and right orientated according to which side of the child they relate to and the clips nest together when linked into the crotch buckle.

13. A method of adjusting a harness wherein the harness is a five point harness, including two shoulder straps extending from a shoulder portion of the seat to a hip portion of the seat and wherein both shoulder straps are centrally linked to a crotch strap originating from a crotch region of the seat; and each shoulder strap includes a front looped section, comprising an adjustable loop having at least a length of strap that runs back along the length of the adjustable loop when in use, the loop being adjustable in length, the transition between a transition at an upper portion of each shoulder strap being fixed about a slot or slots in the upright back portion and wherein each shoulder strap links to the crotch strap via a linkage; and, wherein there are no loose strap endings in a working area of the seat; the method comprising the step of:

(a) adjusting the front loop section length to contract or expand the harness size.

14. The method of claim 13 wherein a shoulder strap attachment point height is adjusted by lifting or lowering the height of the shoulder strap attachment points relative to the upright back portion of the seat.

15. The harness of claim 1, further comprising a child car capsule into which the harness is incorporated.

16. The harness of claim 1, further comprising a child car seat into which the harness is incorporated.

17. The harness of claim 1, further comprising a child buggy into which the harness is incorporated.

* * * * *